April 6, 1937.   A. C. LOEWER   2,076,471
APPARATUS FOR CHECKING THE SPROCKET HOLES OF MOTION PICTURE FILMS
Filed May 10, 1934
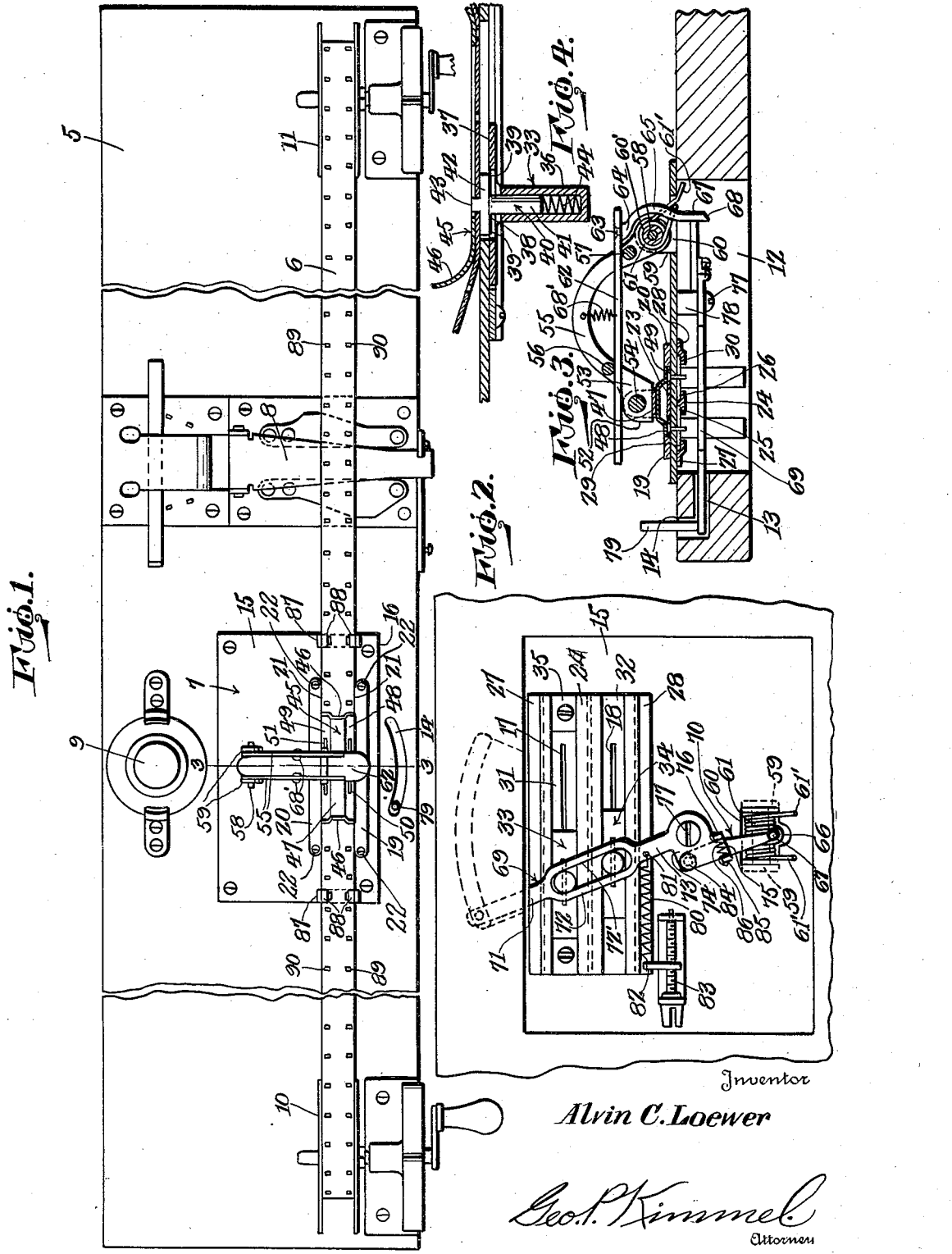
Inventor
Alvin C. Loewer
Geo. P. Kimmel
Attorney Patented Apr. 6, 1937

2,076,471

UNITED STATES PATENT OFFICE 2,076,471

APPARATUS FOR CHECKING THE SPROCKET HOLES OF MOTION PICTURE FILMS

Alvin C. Loewer, Baltimore, Md.

Application May 10, 1934, Serial No. 725,019

21 Claims. (Cl. 73—51)

This invention relates to a detection device for use in connection with motion picture films and has for its object to provide, in a manner as hereinafter set forth, a device of the class referred to for automatically detecting, as well as materially expediting the location of torn or worn sprocket-holes having their length increased to an extent to cause the film to feed improperly through a projector.

A further object of the invention is to provide, in a manner as hereinafter set forth, a device of the class referred to for indicating worn sprocket-holes in a motion picture film.

A further object of the invention is to provide, in a manner as hereinafter set forth, a device of the class referred to for detecting and for indicating a worn sprocket-hole at each side marginal portion of a film of the type referred to.

A further object of the invention is to provide, in a manner as hereinafter set forth, means for expeditiously and accurately detecting and indicating worn sprocket-holes in motion picture films thereby overcoming the slow, inaccurate and inconvenient sight and touch method now generally employed for such purpose.

Further objects of the invention are to provide, in a manner as hereinafter set forth, a device for the purpose referred to which is simple in its construction and arrangement, strong, durable, compact, automatic in its action, thoroughly efficient for the purpose intended thereby, readily assembled, conveniently arranged in position for detecting and indicating a worn sprocket-hole, and inexpensive to manufacture.

To the above ends essentially, and to others which may hereinafter appear, the invention consists of such parts, and such combination of parts as fall within the scope of the invention as claimed.

In the drawing:

Figure 1 is a top plan view of the detection device showing, by the way of example, the adaptation thereof with respect to a motion picture film arranged upon a splicing board for the latter.

Figure 2 is an inverted plan view of the device.

Figure 3 is a section on line 3—3, Figure 1.

Figure 4 is a fragmentary view in longitudinal section illustrating the device in detecting position.

The drawing shows a splicing board 5 for a motion picture film 6 and with the detection device, in accordance with this invention supported by board 5. The device is generally indicated at 7. Upon board 5 is arranged a splicer structure 8, a film cement reservoir 9 and a pair of rotatable reel elements 10, 11 for unwinding and winding the film 6. The elements 5, 8, 9, 10, 11 form no part of the device 7 and are illustrated to show, by way of example, one form of mounting for the latter. When the board 5 is employed to support the device 7 it is formed with a rectangular opening 12 adjacent its outer edge, a segmental groove 13 communicating with opening 12 through the outer side wall of the latter and an upstanding arcuate slot 14 opening at its lower end into the groove 13. The board 5 constitutes a base or support for the device, and if the latter be supported by other means than board 5, then said other means would be formed with the opening, groove and slot and constitute a base or support.

The device 7 includes a flat rectangular plate 15 formed between its longitudinal median and outer side edge 16 with a pair of spaced parallel narrow slots 17, 18 lengthwise thereof intersected intermediate their ends by the transverse median of the plate. The slots 17, 18 are approximately of the same length. Secured upon the upper face of plate 15 is a pair of parallel spaced guide strips 19, 20, the former being positioned in proximity to the outer side wall of slot 17 and the latter in close proximity to the inner side wall of slot 18. The strips 19, 20 coact with the upper face of plate 15 to form a guide groove or passage 21 for the film. Holdfast devices 22 are employed for fixedly securing the strips 19, 20 to plate 15. The strips 19, 20 are of greater length than the slots 17, 18.

Secured to the lower face of plate 15 between and spaced from the slots 17, 18 is the upstanding centrally disposed leg 23 (Figure 3), of an inverted narrow T-shaped member 24. The latter coacts with the lower face of the plate 15 to form a pair of oppositely opening grooves 25, 26. Secured to the lower face of plate 15 is a pair of narrow oppositely disposed members 27, 28 of Z-shape cross section which coact with the lower face of plate 15 to provide a pair of oppositely opening grooves 29, 30. The grooves 25, 26 are arranged in opposed spaced relation to the grooves 29, 30 respectively. The members 24, 27, 28, grooves 25, 26, 29, 30 and lower face of plate 15 coact to provide a pair of guide passages 31, 32 for a pair of combined slide and carrier elements 33, 34 respectively. The members 24, 27, 28 slidably couple the elements 33, 34 in depending relation with respect to plate 15. The ends of passage 31 have arranged therein stops 35 for arresting the sliding movement of element 33 in opposite directions.

Each of the elements 33, 34, with reference to Figure 4 consists of a vertically disposed tubular part 36 closed at its bottom and open at its top. Formed integral with the top of part 36 is the lower face of a rectangular slide 37. The top of part 36 is disposed centrally of the lower face of slide 37. The latter at the intersection of its longitudinal and transverse medians is formed with a circular opening 38 in register with the open upper end of part 36. The slide 37 at its longitudinal median is formed with a pair of endwise opposed short narrow slots 39 communicating at their inner ends with the opening 38 and being closed at their outer ends. The width of slots 39 is materially less than the diameter of opening 38.

Each combined slide and carrier element has mounted therein a vertically movable spring controlled worn-socket-hole detector 40 consisting of a vertically disposed cylindrical shank 41, a horizontally arranged oblong head 42 and an upstanding lug 43 disposed centrally of the upper face of head 42. The sides of the latter are flush with the sides of the lug 43. The width of the head 42 is less than the diameter of the upper end of the shank 41. The head 42 is arranged centrally and diametrically of shank 41. The length of head 42 is materially greater than the diameter of and extends laterally in opposite directions with respect to the upper end of shank 41. The width of the head 42 and the width of lug 43 are such as to permit the head passing into and the lug to extend above a slot 17 or 18. The length of lug 43 is slightly greater than the length and its width is slightly less than the length and width of a non-torn non-worn sprocket hole or perforation. The normal position of head 42 is within the opening 38 and slots 39 of a slide 37. The normal position of the lug 43 is within a slot 17 or 18. The head 42 and lug 43 are releasably held in normal lowered position, in a manner to be referred to against the action of a controlling spring 44 for the stem 41. The spring 44 is arranged within the part 36 of an element 33 or 34 and is interposed between the inner end of the shank and the bottom of part 36.

The device includes a normally latched spring controlled pivoted film holding down and worn sprocket-hole indicator member 45 of oblong contour in plan. The member 45 has upturned curved end portions 46, an arch shaped central portion 47 and a pair of spaced flat side marginal portions 48, 49 formed lengthwise thereof with narrow slots 50, 51 respectively for registering with the slots 17, 18 respectively. The width of member 45 is such as to allow it to be positioned between the strips 19 and 20 and in the guide passage 21 for the film. An upstanding yoke 52 is secured to the central portion 47 of member 45. Fixed at their outer ends 53 to the yoke 52, by the holdfast means 54 are two parallel spaced lifting arms 55 of like form and substantially of arch shaped contour. The arms 55 are connected together by front and rear cross bars 56, 57 respectively. The bar 56 is arranged at a higher level than the bar 57. The inner ends of the arms 55 are connected to a pivot 58 supported in a pair of apertured ears 59 carried by plate 15. The ears 59 are arranged at the ends of a rectangular opening 60 formed in plate 15. Arranged between the inner ends of the arms 55 and carried by the pivot 58 is a spacing collar 60' upon which is coiled a controlling spring 61 having its ends 61' bearing against the lower face of plate 15.

Associated with the arms 55 is an elevating member 62 therefor in the form of a flatwise disposed oblong bar bearing against the lower face of cross bar 56 and seated upon the bar 57. The member 62 extends forwardly and rearwardly with respect to the bars 56, 57 and has secured thereto, rearwardly of bar 57, as at 63 a depending operating arm 64 therefor. The arm 64 has a curved stretch 65 which passes through a looped extension 66 provided by a part of the spring 61 at the rear of the latter. The arm 64 depends below the spring 61, and the latter acts upon arm 64 to shift member 62 upwardly to elevate the arms 55 and the lifting of the member 45 to indicating position under conditions to be referred to. The arm 64 includes a straight lower portion 67 having a beveled free end 68. The member 62 is resiliently connected intermediate its ends to the arms 55, as at 68'.

The elevating member 62 is normally latched in lowered position whereby the member 45 and arms 55 will be held in the position as shown in Figures 1 and 3. The members 45, 62 and arms 55 will remain in lowered position until a worn sprocket-hole is detected and when this occurs, the detector member 40 will be elevated to indicate that a worn-sprocket-hole has been discovered, as well as making visible to the attendant such hole. The means or mechanism for releasably latching members 45, 62 and arms 55 in lowered position consists of a spring controlled horizontally arranged operating lever 69 arranged below plate 15 and carrying a pivoted spring controlled latching member 70 coacting with the lower portion 67 of the arm 64. The lever 69 consists of an outer end stretch 71, an intermediate stretch 72 in the form of a loop 72' through which extend the tubular parts 36 of the elements 33, 34, and an inner stretch 73 formed with a laterally disposed offset part 74 provided with an extension 75 having one side formed with an apertured lug 76. The stretch 73 is pivotally mounted on a headed pivot 77 depending from plate 15. Interposed between the stretch 73 and plate 15, as well as being mounted on pivot 77 is a spacing collar 78. The stretch 71 extends through the groove 13 (Figure 3) into the slot 14 and carries an upstanding handle member 79 extending beyond the upper face of board 5 to permit of manually releasing the indicator member 45 from film holding down position when desired. During the normal operation of the device the member 45 is automatically released from film holding down position and how this is accomplished will be referred to. The controlling spring for lever 69 is indicated at 80 and has one end, as at 81 attached to the stretch 73. The other end of spring 80 is secured, as at 82 to an adjustable tensioning means 83 for the spring. The said means 83 is anchored to the lower face of plate 15. The latching member 70 is adapted to abut the lower portion 67 of arm 64 to prevent the controlling spring 61 acting to elevate the member 62. The abutting position of the latching member 70 with respect to the lower portion of arm 64 is shown in Figure 3. The latching member 70 is arranged against the lower face of and is pivotally connected at one end, as at 84 to one end of the offset part 74 of stretch 73. The member 70 is of a length to extend beyond the extension 75 and is formed intermediate of its outer side thereof with an apertured lug 85. The controlling spring for member 70 is designated 86 and is arranged over the extension 75. The ends of spring 86 are connected to the lugs 76 and 85.

The spring 80 normally tends to maintain the lever 69 in the position shown in Figure 2. The spring 86 normally tends to maintain the member 70 in the position shown in Figure 2 with the lug 85 abutting a side edge of the extension 75. The member 70 is shown in Figure 2 as latched with respect to the arm 64.

Carried at the ends of the plate 15 and in alignment with the passage 21 are upstanding yokes 87 arranged in parallel spaced relation. Secured on the upper end of the inner face of each arm of each yoke is a guide roller 88. The rollers carried by each yoke are arranged in spaced alignment. The film 6 travels through the yokes 87, against the rollers as it moves towards and from the guide passage 21. If a stretch of the film 6 between the yokes is to be raised above the strips 19 and 20 for examination or otherwise the rollers 88 facilitate the pulling action upon the film 6.

The normal position of the detection device is as shown in Figure 1; the film 6 being arranged in the passage 21; the member 45 being arranged in juxtaposition to a stretch of the film; the slots 50, 51 of member 45 align with the slots 17, 18 in plate 15; the latching member 70 abuts the arm 64; and the detectors 40 are held in a lowered position by the film 6 and member 45. The rows 89, 90 of the sprocket-holes at the side marginal portions of the film 6 are to align with the slots 50, 51 respectively as the film travels through passage 21.

As long as the sprocket holes of the film are of normal size the detectors 40 will be held in their lower or inactive position. Immediately upon a worn-sprocket-hole passing upon the top of a lug 43 of a detector 40, the lug 43 will be caused to enter such hole due to the action of the spring 44. As the film continues to move, the coaction of lug 43 with the wall of the worn-sprocket-hole will provide for an element 33 or 34 being carried with the film. The element 33 or 34 will then cause the shifting of the lever 69 against the action of its controlling spring resulting in the shifting of member 70 clear of its abutting relation with respect to arm 64 thereby releasing the latter. When arm 64 is released, the spring 61 will act upon the latter and lift or elevate the member 62 whereby the member 45 will be carried therewith from its lowered position and indicate that a worn-sprocket-hole has been detected. The shift of the film is discontinued and the operator may readily note the worn-hole, as a lug 43 is extended therein. The stretch of the film containing the worn-hole is pulled upwardly and a square thereof containing such hole is severed off of the film body, after which the latter is spliced. The lever 69 is not moved to its normal position until the lug 43 is moved clear of the worn-hole. The film holding down and worn-sprocket-hole indicating mechanism is lowered manually to its normal position, and when so lowered the lower portion 67 of arm 64 is arranged to abut the member 70 whereby said mechanism is releasably secured in its film holding down position. The space between plate 15 and member 45 is such as to permit the film 6 to easily travel through passage 21.

The arrangement of the parts of the device is such that there is provided a means for automatically detecting and indicating a worn-sprocket-hole, whether such hole be in either row 89 or 90.

What I claim is:

1. In a detection device, a normally stationary slidably mounted detecting unit including an element arranged to be depressed by the travel thereover of a film provided with a row of sprocket receiving openings normally of uniform size or enter an abnormally enlarged one of the said openings and thereby cause the unit to be slid from its normally stationary position by said film, an automatically upwardly shiftable film depressing and concealing structure for that portion of the film traveling over said element, means for latching said structure to normally depress and conceal that portion of the film traveling over said element, and means operated from said unit when the latter is moved from its normally stationary position for withdrawing the latching means from said structure to permit of the automatic elevating thereof from its normal position and thus indicate the detection of an enlarged opening.

2. In a detection device, a normally stationary slidably mounted detecting unit including an element arranged to be depressed by the travel thereover of a film provided with a row of sprocket receiving openings normally of uniform size or enter an abnormally enlarged one of the said openings and thereby cause the unit to be slid from its normally stationary position by the film, a film depressing and concealing means, an elevating mechanism for said film depressing and concealing means, a latching mechanism for normally holding said elevating mechanism in a lowered position to provide for said depressing and concealing means normally concealing and depressing that portion of the film traveling over said element, and means operated from said unit, when the latter is slid from its normally stationary position, to withdraw the latching mechanism from the elevating mechanism whereby the latter will move the film depressing and concealing means upwardly and thus indicate the detection of an enlarged opening.

3. In a detection device, a normally stationary slidably mounted detecting unit including an element arranged to be depressed by the travel thereover of a film provided with a row of sprocket receiving openings normally of uniform size or enter an abnormally enlarged one of the said openings and thereby cause the unit to be slid from its normally stationary position by the film, a depressing and concealing means for that portion of the film traveling over said element, a spring actuated elevating mechanism for said depressing and concealing means, a latching mechanism for said elevating mechanism, and means operated from said unit, when the latter is slid from its normally stationary position, to withdraw the latching mechanism from the elevating mechanism whereby the latter will raise the film concealing and depressing means and thus indicate the detection of an enlarged opening.

4. In a detection device, a normally stationary slidably mounted detecting unit including an element arranged to be depressed by the travel thereover of a film provided with a row of sprocket receiving openings normally of uniform size or enter an abnormally enlarged one of the said openings and thereby cause the unit to be slid from its normally stationary position by the film, a film depressing structure, an elevating mechanism for said structure, a latching mechanism for said elevating mechanism, and means operated by the detecting unit, when the latter is slid from its normal position for withdrawing the latching mechanism from the elevating mechanism to permit the latter to raise the film depressing structure and thus indicate the detection of an enlarged opening.

5. In a detection device, a support adapted to have travel thereover a film body formed with a row of sprocket openings normally of uniform size, said support being formed with a slot for registry with said openings, a normally stationary spring influenced detecting unit slidably mounted in said support and having means adapted to pass through said slot for entering an abnormally enlarged one of the said openings and thereby cause the unit to be slid from its normally stationary position by the film against said spring influence, and a normally latched spring actuated enlarged opening indicating mechanism releasable by said unit, when the latter is slid from its normally stationary position, for movement to indicate the detection of an enlarged opening.

6. In a detection device for the purpose set forth, a support adapted to have travel thereover a film provided with a row of sprocket receiving openings normally of uniform size, said support being formed with a slot for registry with said openings, a normally stationary horizontally slidable spring influenced detecting unit slidably connected to said support and including an element arranged to be depressed by the traveling film and capable of passing through said slot for entering an abnormally enlarged one of the said openings and thereby cause the unit to be slid from its normally stationary position by the film against said spring influence, a spring actuated indicating mechanism releasable when said unit is slid from its normally stationary position, a film depressing and concealing mechanism arranged in superposed relation with respect to said unit and carried by said indicating mechanism, a spring actuated elevating means for raising said indicating mechanism, a spring influenced latching mechanism for normally latching said elevating means in lowered position, and an actuating connection between said unit and latching mechanism, said connection being operated from said unit, when the latter is slid from its normally stationary position, to shift said latching mechanism in a direction to release said elevating mechanism to provide for the raising of said elevating mechanism and said depressing mechanism and thus indicate the detection of an enlarged opening.

7. In a detection device, a support adapted to have travel thereover a film body formed with spaced rows of sprocket receiving openings normally of uniform size, said support being formed with spaced parallel slots, each for registry with the openings of a row, spaced normally stationary detecting units slidably connected to said support and each including a spring urged element arranged to be depressed by the film and capable of passing through one of said slots for entering an abnormally enlarged one of the said openings of a row and thereby cause its respective unit to be slid from its normally stationary position by the film, and a latched spring actuated indicating structure releasable by a unit of the pair, when such unit is slid from its normally stationary position, for movement to indicate the detection of an enlarged opening.

8. In a detection device, a support adapted to have travel thereover a film body formed with spaced rows of sprocket receiving openings normally of uniform size, said support being formed with spaced parallel slots, each for registry with the openings of a row, spaced detecting units slidably connected to said support and each including a spring urged element arranged to be depressed by the travel thereover of the film and capable of passing through one of said slots for entering an abnormally enlarged one of the said openings of a row and thereby cause its respective unit to be slid from its normally stationary position by the film, a normally lowered film body holding down mechanism pivotally connected to the support and arranged above said units, said mechanism being formed with slots aligning with the slots of said support for receiving said spring urged elements when extended through the slots in the support, a spring actuated elevating device for said mechanism, a spring influenced latching mechanism for and normally latching said device for maintaining the said other mechanism in film holding down position, and connections between said units and the latching mechanism, each connection being adapted when a unit is slid from its normally stationary position, to shift said latching mechanism in a direction to release said device to provide for the raising of the film holding down mechanism and thus indicate the detection of an enlarged opening.

9. In a detection device for abnormally enlarged sprocket receiving openings in motion picture films, a normally stationary detecting unit including an element arranged to be depressed by the travel thereover of the film or enter an abnormally enlarged one of the said openings and thereby cause the unit to be slid from its normally stationary position by the film, a normally lowered indicator structure for holding down the film on said element during the travel of the film, means for elevating said structure and thus indicate the detection of an enlarged opening, a latching mechanism for said means, and an actuating connection for operating said mechanism to release said means from said latching mechanism to provide for the said means elevating said structure to indicate the detection of an enlarged opening.

10. In a detection device, a normally stationary horizontally slidable detecting unit including a spring urged element arranged to be depressed by the travel thereover of a film provided with a row of sprocket receiving openings normally of uniform size or enter an abnormally enlarged one of the said openings and thereby cause said unit to be slid from its normally stationary position by the film, a normally latched spring actuated film holding down structure for indicating, when released, the detection of an enlarged opening, and means operated from said unit, when the latter is slid from its normally stationary position, for releasing said structure.

11. In a detection device, a normally stationary slidably mounted detecting unit including an element arranged to be depressed by the travel thereover of a film provided with a row of sprocket rceiving openings normally of uniform size or enter an abnormally enlarged one of the said openings and thereby cause the unit to be slid from its normally stationary position by the film, a pivoted combined film holding down and enlarged opening indicating structure, a spring actuated elevating means for said structure, a latching mechanism for normally maintaining said means in inactive position thereby seating said structure in holding down position, and an actuating connection for operating said mechanism to release said means to make the latter active whereby said structure is shifted from holding down position to indicate the detection of an enlarged opening, said actuating connection being connected with and operated from said unit when the latter is slid from its normally stationary position.

12. In a detection device, a normally stationary slidably mounted detecting unit including an element arranged to be depressed by the travel thereover of a film provided with a row of sprocket receiving openings normally of uniform size or enter an abnormally enlarged one of the said openings and thereby cause the unit to be slid from its normally stationary position by the film, a pivoted combined film holding down and enlarged opening indicating structure, a spring actuated elevating means for said structure, a latching mechanism for normally maintaining said means in inactive position thereby seating said structure in holding down position, an actuating connection for operating said mechanism to release said means to make the latter active whereby said structure is shifted from holding down position to indicate the detection of an enlarged opening, said actuating connection being connected with and operated from said unit when the latter is slid from its normally stationary position, and a support common to the unit, connection, mechanism and structure.

13. In a detection device, a normally stationary spring influenced slidably mounted detecting unit including a spring urged element arranged to be depressed by the travel thereover of a film provided with a row of sprocket receiving openings normally of uniform size or enter an abnormally enlarged one of the said openings and thereby cause the unit to be slid horizontally from its normally stationary position by the film against said spring influence, and normally latched spring actuated indicating means releasable from said unit, when the latter is moved from its normally stationary position, for indicating the detection of an enlarged opening.

14. In a detection device, a pair of normally stationary spring influenced slidably mounted detecting units including spring urged elements arranged to be depressed by the travel thereover of a film provided with two rows of sprocket receiving openings normally of uniform size or enter an abnormally enlarged one of the said openings of a row and thereby cause its respective unit to be slid horizontally from its normally stationary position by the film against said spring influence, and an abnormally enlarged opening spring actuated indicating means common to said units and releasable to indicating position by a unit slid by the film from its normally stationary position to indicate the detection of an enlarged opening.

15. In a detection device, a spring influenced normally stationary slidably mounted detecting unit including a spring urged element arranged to be depressed by the travel thereover of a film provided with a row of sprocket receiving openings normally of uniform size or enter an abnormally enlarged one of the said openings and thereby cause the unit to be slid horizontally from its normally stationary position by the film against said spring influence, a pivoted spring actuated enlarged opening indicating structure normally in non-indicating position, releasable means holding said structure in its aforesaid position, and means actuated from said unit, when the latter is moved from its normally stationary position, for releasing said releasable means to permit said structure to assume a position to indicate the detection of an enlarged opening.

16. In a detection device, a spring influenced normally stationary slidably mounted detecting unit including a spring urged element arranged to be depressed by the travel thereover of a film provided with a row of sprocket receiving openings normally of uniform size or enter an abnormally enlarged one of the said openings and thereby cause the unit to be slid horizontally from its normally stationary position by the film against said spring influence, and means operated from said unit when the latter is moved from its normally stationary position for indicating the detection of an enlarged opening, said means including a spring influenced latching element and a spring actuated indicating element.

17. In a detection device, a normally stationary slidably mounted detecting unit including an element arranged to be depressed by the travel thereover of a film provided with a row of sprocket receiving openings normally of uniform size or enter an abnormally enlarged one of the said openings and thereby cause the unit to be slid from its normally stationary position by the film, and a normally latched spring actuated combined film depressing and enlarged opening indicating structure releasable for movement to indicate the detection of an enlarged opening when said unit is moved from its normally stationary position.

18. In a detection device, a normally stationary slidably mounted detecting unit including a spring urged element arranged to be depressed by the travel thereover of a film provided with a row of sprocket receiving openings normally of uniform size or enter an abnormally enlarged one of said openings and thereby cause the unit to be moved from its normally stationary position by the film, a normally lowered latched, automatically upwardly movable spring actuated film holding down and enlarged opening indicating structure arranged over the path of the film and formed with a slot for registry with the openings in the latter and for the passage therethrough of said element to enter an abnormally enlarged opening of the film, and means connected with said unit and operated by the latter when it is slid from its normally stationary position for releasing said structure whereby the latter will be elevated and thus indicate the detection of an enlarged opening.

19. In a detection device, a pair of parallel normally stationary slidably mounted spaced detecting units including spring urged elements arranged to be depressed by the travel thereover of a film provided with parallel spaced rows of sprocket receiving openings normally of uniform size or enter an abnormally enlarged one of the openings of such row and thereby cause the unit with which it is associated to be slid from its normally stationary position by the film, a normally lowered automatically upwardly movable spring actuated film holding down and enlarged opening indicating structure arranged over the path of the film, a latching means for said structure, and means connected to said units and operated by either one of the units, when a unit is slid from its normally stationary position by the film, for actuating said latching means to release said structure therefrom whereby the latter automatically moves upwardly and thus indicates the detection of an enlarged opening and to provide for said units sliding in unison, 20. In a detection device, a pair of parallel normally stationary slidably mounted spaced detecting units including spring urged elements arranged to be depressed by the travel thereover of a film provided with parallel spaced rows of sprocket receiving openings normally of uniform size or enter an abnormally enlarged one of the openings of such row and thereby cause the unit with which it is associated to be slid from its normally stationary position by the film, a normally lowered automatically upwardly movable spring actuated film holding down and enlarged opening indicating structure arranged over the path of the film, a latching means for said structure, means connected to said units and operated by either one of the units, when a unit is slid from its normally stationary position by the film, for actuating said latching means to release said structure therefrom whereby the latter automatically moves upwardly and thus indicates the detection of an enlarged opening and to provide for said units sliding in unison, and said structure being formed with a pair of parallel slots providing clearances for said elements.

21. In a detection device, a pair of parallel normally stationary slidably mounted spaced detecting units including spring urged elements arranged to be depressed by the travel thereover of a film provided with parallel spaced rows of sprocket receiving openings normally of uniform size or enter an abnormally enlarged one of the openings of such row and thereby cause the unit with which it is associated to be slid from its normally stationary position by the film, a normally lowered automatically upwardly movable spring actuated film holding down and enlarged opening indicating structure arranged over the path of the film, a latching means for said structure, means connected to said units and operated by either one of the units, when a unit is slid from its normally stationary position, for actuating said latching means to release said structure therefrom whereby the latter automatically moves upwardly and thus indicates the detection of an enlarged opening and to provide for said units sliding in unison, a support slidable suspending said units and formed with a pair of slots for the passage of said elements, said support being common to said structure, latching means and actuating means for the latching means, said structure having a part thereof depending through said support to extend in the path of said latching means, and said actuating and latching means arranged below said support.

ALVIN C. LOEWER.